US005123868A

United States Patent [19]

Waymouth

[11] Patent Number: 5,123,868

[45] Date of Patent: Jun. 23, 1992

[54] ELECTROMAGNETIC RADIATORS AND PROCESS OF MAKING ELECTROMAGNETIC RADIATORS

[75] Inventor: John W. Waymouth, Marblehead, Mass.

[73] Assignee: John F. Waymouth Intellectual Property and Education Trust, Marblehead, Mass.

[21] Appl. No.: 689,694

[22] Filed: Apr. 17, 1991

[51] Int. Cl.[5] .......................... H01J 9/12; B23K 31/02

[52] U.S. Cl. ...................................... 445/48; 228/161; 428/613; 445/49

[58] Field of Search ............................. 445/49, 50, 48; 228/161; 428/613; 313/348, 349

[56] References Cited

U.S. PATENT DOCUMENTS

| | | | |
|---|---|---|---|
| 978,302 | 12/1910 | Joyce | 72/467 |
| 1,156,492 | 10/1915 | Remane | 72/42 |
| 1,293,116 | 2/1919 | Keyes | 72/42 |
| 1,345,441 | 7/1920 | Hisamoto | 29/43 |
| 1,591,474 | 7/1926 | Dornier | 428/613 |
| 2,619,438 | 11/1952 | Varian et al. | 313/349 |
| 3,223,878 | 12/1965 | Todd | 313/349 |
| 3,376,463 | 4/1968 | Feinstein | 445/49 |
| 3,572,399 | 3/1971 | Walter et al. | 140/71.5 |
| 4,678,718 | 7/1989 | Wang | 428/560 |
| 4,863,527 | 9/1989 | Schaeffer et al. | 148/11.5 F |

*Primary Examiner*—Kurt Rowan
*Assistant Examiner*—Jeffrey T. Knapp
*Attorney, Agent, or Firm*—Owen J. Meegan

[57] ABSTRACT

A method of forming a electromagnetic radiator having cavities of predetermined dimensions involving coating a plurality of wires with an electromagnetic radiator material at predetermined thicknesses, the wires being soluble in a solvent and the radiator material being insoluble in the solvent, forming a bundle of a multiplicity of the coated wires, the coatings on the wires engaging each other, reducing the diameter of the bundle to a smaller predetermined diameter and fusing the coatings together with metallurgical bonds through the reduction thereby uniformly reducing the diameter of each of the coated wires and thicknesses of each of the coatings on the wires in the bundle, slicing partially through the fused bundle at predetermined regular intervals whereby to define the depth of the cavities, chemically removing the wires from inside the coatings whereby to form a foraminous electromagnetic radiator having an array of cavities of predetermined lengths and diameters formed by the drawn coatings. The invention also involves a ribbon made by the process and suitable for use as an incandescent lamp filament.

15 Claims, 5 Drawing Sheets

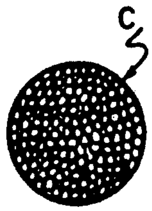
FIG.4A
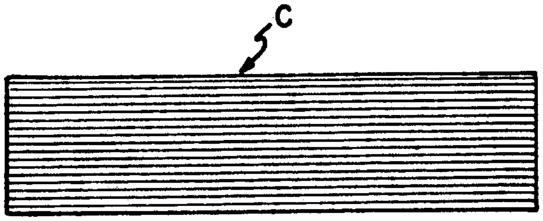
FIG. 4
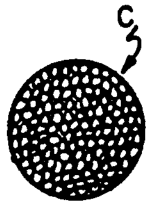
FIG.5A
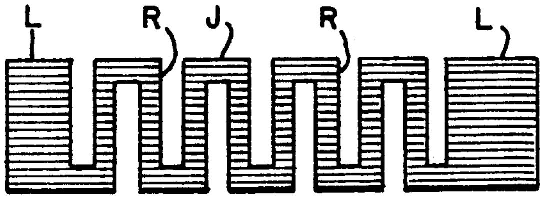
FIG.5
FIG.6
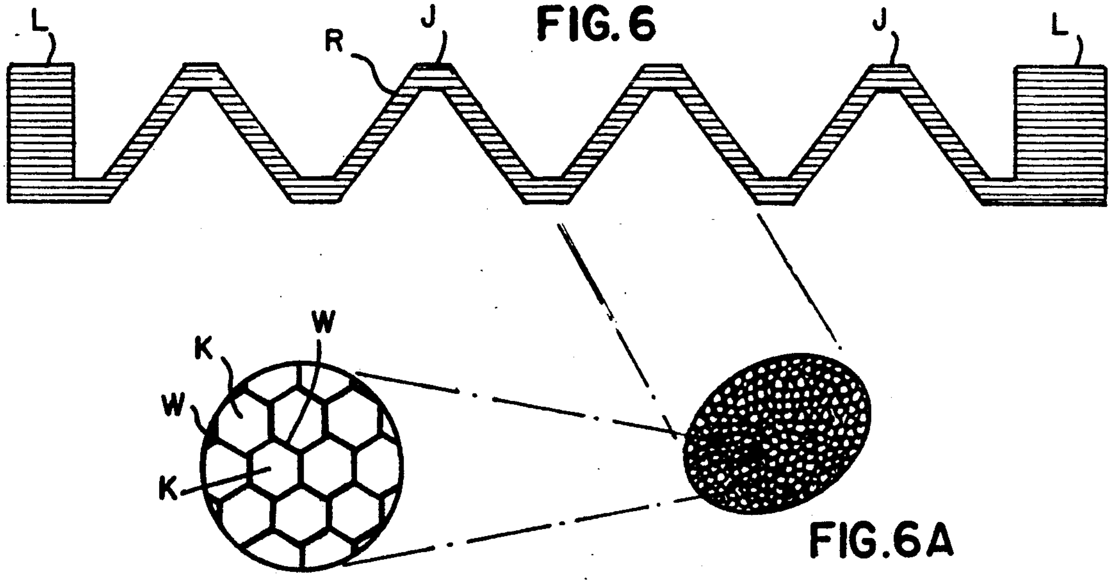
FIG.6A
FIG.6B

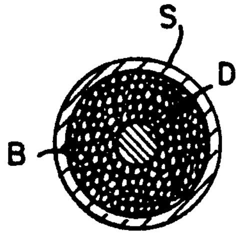
FIG. 11A
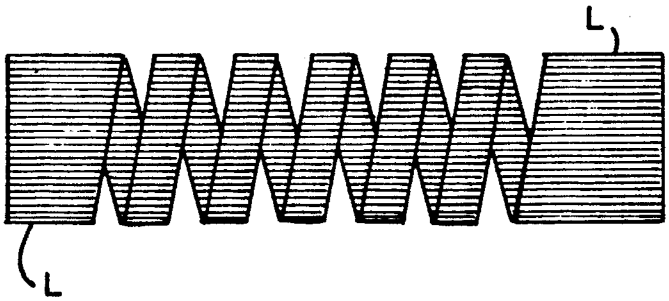
FIG. 11
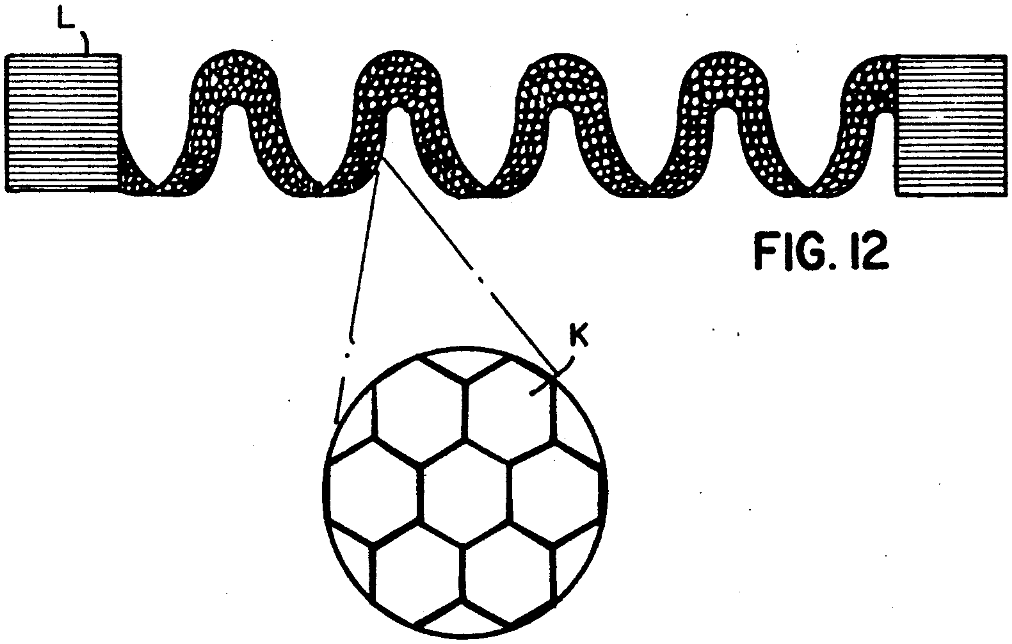
FIG. 12
FIG. 12A

ELECTROMAGNETIC RADIATORS AND PROCESS OF MAKING ELECTROMAGNETIC RADIATORS

FIELD OF THE INVENTION

The present invention relates to a process of making electromagnetic radiators and particular to the manufacture of an electromagnetic radiator in the form of a ribbon that can be used as an optical light source device described in my co-pending application, Ser. No. 405,209 filed Sep. 8, 1989, now U.S. Pat. No. 5,051,649.

BACKGROUND OF THE INVENTION

It is known that a major impediment in achieving high luminous efficiency in incandescent lamps is that many of the systems for converting energy into visible light result in the production of significant quantities of long wave-length infra-red emission to which the eye does not respond. Such emission occurs at the expense of visible light of short-wave length.

In the past, the temperature of a radiating body has been elevated or radiating species have been contemplated which limit the emissions of the radiating body in the infra-red region. Raising the temperature results in a shifting of the black body radiation curve that sets the upper limit of emissions towards shorter wave lengths and permits radiating transitions producing enhancement of visible light. Although advantage of this lift with increasing temperatures is taken to the fullest of which the most favorable materials are capable, it is still well known that incandescent filaments radiate over 90% of their emissions in the infra-red region not perceived by the eye.

Accordingly, the primary object of the present invention is the fabrication of electromagnetic radiators in the shape of a ribbon in which there is emission suppression in the form of an array of cavities in the radiator, the dimensions of the cavities being such that radiation emitted at wavelengths greater than a predetermined wavelength value cannot be propagated by the radiator. The radiator of the present invention suppresses at least a majority of the non-visible infra-red radiation that would otherwise be emitted from it. To provide such suppression, the radiator of the invention has cavities of predetermined widths and regular shapes. The cavities have mean widths of about 350 nm. and are separated by walls of thicknesses less than about one half the mean widths of the cavities, the depths of the cavities being significantly greater than the widths of the apertures so as to suppress emissions of electromagnetic radiation of wave lengths longer than about 0.7 microns without affecting the emission of shorter wave lengths whereby the ratio of emission of infra-red light to that of visible light from the radiators will be substantially reduced thus to increase the luminous efficiency of devices in which they are used. In summary, the cavities have predetermined widths such that only radiation emitted at wavelengths less than a predetermined value can be propagated by the radiator, the predetermined wavelength being selected to suppress a majority of the non-visible infrared that would otherwise be emitted by the device in which it is disposed.

SUMMARY OF THE INVENTION

The method of manufacture and the radiator embodied herein involves well known metal working processes applied in a manner such as to produce a unique structure of a foraminous ribbon perforated with an array of cavities of small and predetermined widths and depths, the ends of the cavities terminating in apertures, the cavities being as least as deep as the width of the respective apertures and each of the cavities separated from another by walls having thicknesses less than half that of the width of the aperture.

The thus formed ribbon may be electrically heated by passage of current from one end to the other, thus providing a convenient means of achieving the elevated temperature for emission of electromagnetic radiation. The apertures of the cavities and the thicknesses of the walls are controlled as a result of the fabrication process herein described to meet the cavity quantum electrodynamics requirements for suppression of infra-red radiation, as described in my co-pending application mentioned above. The product fabricated according to the steps of the present invention can be utilized to produce a high efficiency incandescent lamp in which the infrared emission is suppressed and the visible radiation is enhanced.

According to the present invention, uniform coatings of an electromagnetic radiator material such as the refractory metal tungsten or molybdenum are deposited upon the exterior surface of a substrate or mandrel of a different metal which is preferably in wire form. Such deposition can be provided by any of the well known conventional techniques for the deposition of metal on substrates. The two metals selected must be such that a solvent or acid can dissolve the substrate (thus removing it from the assembly) without dissolving or removing the coating metal. The wires can be conveniently formed of molybdenum or steel that serve conventionally as mandrels for the manufacture of tungsten coils or steel for molybdenum coils as is well known in the art.

After coating the wires to uniform predetermined thicknesses, they are cut in convenient lengths and bundled into a more or less hexagonal array. The bundle is reduced in diameter and elongated in length by well known metal working processes for reduction of wire diameter such as swaging, rolling and wire drawing. Rebundling the thinner, elongated bundles can be repeated over and over again until apertures and cavities of predetermined widths are formed. Drawing the bundles in the final stages of diameter reduction is preferred, as is known in the art.

As a result of the metal working process, the bundle of coated wires is fixed into a single unitary structure with the mandrel wires elongated and reduced in diameter into a nested array of fibers of generally hexagonal cross section, separated by walls of more or less uniform thicknesses formed of the coating metal, proportionally elongated and reduced in lateral dimension. The individual cavities will ultimately have a hexagonal shape even though the cross sections of the individual wires were initially circular because squeezing an array into a considerable reduction in diameter compresses the wires and the coatings into hexagonal shapes.

Such well known diameter-reduction techniques also involve heat treatments during the process. During the course of the metal working, the surfaces of the individual metal coatings contact each other and fuse into metallurgical bonds while the wires that serve as mandrels are elongated. The metallurgical bonds that are produced occur by welding and atomic interdiffusion. The diameter reductions of the bundle and the heat treatments at each stage are controlled so as to attain simultaneously the diameter reduction and the welding.

After the metal working has been completed, the metallurgically bonded bundle is cut into lengths as are appropriate for lamp filaments. Among the different designs of lamp filaments that can be fabricated according to the present invention two are described which are especially useful. In one design the filament has a spiral configuration and in another it has angular shapes. Except for sections at either end which will provide mechanical connections, when making the angular radiators the bonded bundle is partially sliced from alternative opposite sides in such a way that the thickness of the slices will be thin in comparison to their lengths and will be adequate to provide mechanical strength and electrical resistance. In the other design, the bundle is spirally cut around the axis of the bundle and then stretched to produce a helically shaped radiator.

With the angular radiators, the cuts are made generally perpendicularly to the longitudinal axis of the stretched bundle of coated wires. When stretched axially, a zig-zag shaped ribbon is formed which has faces that were originally perpendicular to the longitudinal axis of the bundle, but each face after stretching is disposed generally outwardly and not toward another. With the spirally cut bundle the ribbon will be helically shaped when stretched. The stretched ribbon is immersed in an acid or solvent so as to dissolve the wire mandrel substrate. The chemical reaction begins at the distal ends of the slices and creates holes or cavities which penetrate into the surface of the slices. Dissolving the mandrel can be continued until all the mandrel metal has been etched completely from both sides of a sliced segment leaving only the residual structure of the walls of the coating metal surrounding empty cavities; or the dissolving can be stopped prematurely whereby some mandrel metal can be left inside the cavities to form two distinct cavities rather than only one. Through the herein described techniques, cavities having predetermined widths and depths, separated by walls of predetermined thicknesses are formed.

BRIEF DESCRIPTION OF THE DRAWINGS

FIGS. 4 and 4*a* are an end view and side elevational view of the bundle reduced to the predetermined diameter;

FIGS. 5 and 5*a* are a cross-sectional and side view of the bundle of FIG. 4 that has been sliced from alternate sides to form an axially stretched ribbon with an angular shape;

FIGS. 6, 6A and 6B are side views of the stretched ribbon of FIG. 5 pulled to form zig-zag segments. In the magnified view 6A, 6B, and the further magnified view the walls of the cavities perforating the surface of a segment are shown. The cavities are of predetermined widths, separated from each other by walls of predetermined thicknesses. In the magnified views, the wires that serve as mandrels have been dissolved to leave only the walls.

In FIG. 7 a bundle of wires is swaged in a sheath of copper to form an encapsulated unit. FIG. 8 is a cross sectional view of the encapsulated bundle of coated wires before and after one of the diameter reduction steps;

FIGS. 11 and 11A illustrates embodiment in which the ribbon is sliced spirally and FIGS. 12 and 12A illustrates the shape of the ribbon when it is stretched. Magnified FIG. 12A illustrates the shape of the cavities of the radiator.

DESCRIPTION OF THE PREFERRED EMBODIMENT

According to the present invention, I have invented a method of manufacture of a electromagnetic radiator having minute cavities of predetermined shapes, widths and lengths by utilizing known metal working processes of the art. In accordance with the present invention, I have produced a unique structure of a foraminous ribbon perforated with a uniform array of cavities of small diameter, at least as deep as the aperture is wide and separated by walls of thicknesses less than half that of the aperture. The ribbon can be electrically heated by passage of current from one end to the other, thus providing a convenient mechanism for achieving an elevated temperature for emission of electromagnetic radiation. The apertures of the cavities and their wall thicknesses are controlled by the fabrication process to meet cavity quantum electrodynamics requirements for suppression of infra-red radiation to produce a filament for a high efficiency incandescent lamp, as disclosed in my co-pending application, mentioned above.

Figure 1:
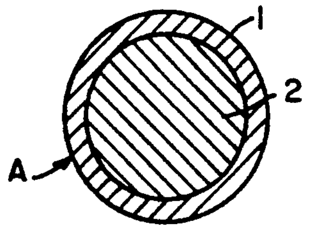
FIG. 1 is a cross-sectional view of a coated wire mandrel.

According to the present process, as shown in FIG. 1, a coating 1 of uniform thickness of a radiator metal is deposited upon the surface of a wire 2 that forms a mandrel whereby to form a coated wire A. The deposition may be accomplished by any of the well known techniques of plating, flame spray, physical evaporation, sputtering from a target or chemical vapor deposition as are well known. The wire 2 may be of any convenient diameter (such as 0.025 to 0.10 mm.) and the thickness of the coating 1 is preferably less than about one quarter the wire diameter. Subsequent removal of the wire or mandrel is accomplished by using well known lamp filament making techniques, as will be described hereinafter.

Many combinations of metals as radiators and mandrels are known to the art and are within the scope of my invention. For purposes of making a tungsten cavity quantum electrodynamic radiator, the coating metal is tungsten and the mandrel or wire can be molybdenum.

Figure 2:
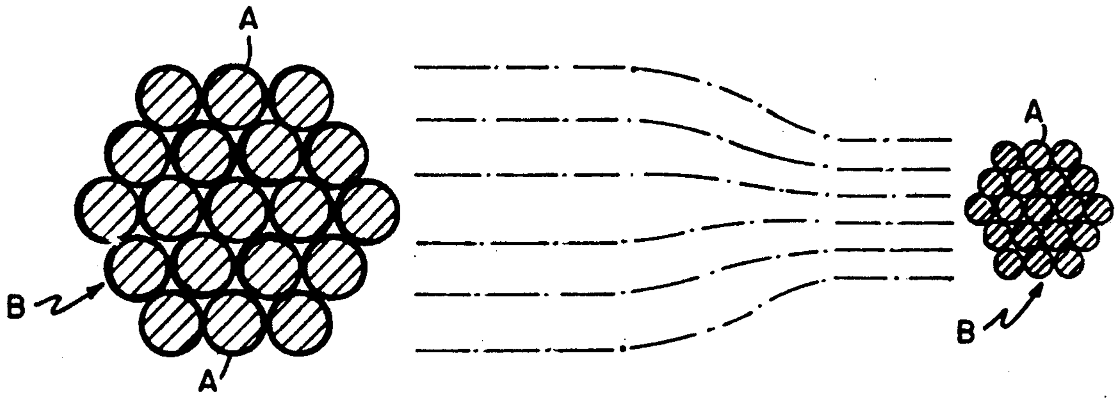
FIG. 2 is a bundle of the coated wires shown in FIG. 1 arranged to be reduced in diameter. On the right side is a view of the partially reduced bundle.

As shown in FIG. 2, a multiplicity of the individual coated wires A, preferably in the neighborhood of many thousands, are preferably arranged in a hexagonal, closely-spaced array to form a bundle B. The bundle B is reduced in diameter and elongated in length (as seen on the right of the FIG. 2) by any combination of the well known metal working processes of swaging, rolling and/or wire-drawing.

Figure 3:
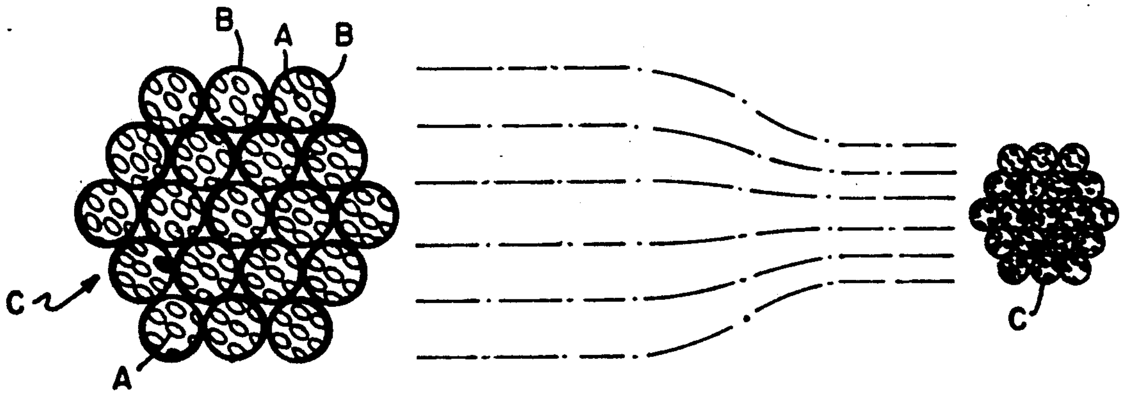
FIG. 3 is a cross-sectional view of an array of bundles from FIG. 2 arranged to be reduced further.

Each of these metal working processes requires associated heat treatment steps, as is well known. A plurality of the bundles B resulting from the metal working steps of FIG. 2 can be rebundled as shown at C in FIG. 3 to make bundles C with ever increasingly narrower cavities until the desired width and wall thickness is attained (as shown on the right in FIG. 3).

During the metal working process, the surfaces of the coatings are brought in contact and fused in metallurgical bonds by welding and atomic interdiffusion occurring as a result of the metal working stresses and the heat treatments. The degree of diameter reduction and the heat treatments at each stage are controlled by the properties of the least ductile of the two metals that are used in order that neither of them will break or separate into axially discontinuous segments. The manner and method of establishing such diameter reductions are well known to the art of metal working.

As a consequence of the metal working processes, the wires of the mandrel are drawn down into fibers which are separated from each other in a regularly-shaped array by a network of walls of the coating metal. These walls are in turn reduced in thickness and elongated in length to a degree substantially proportional to the reduction in diameter and elongation of the wires under the coatings. The metal working is continued until the diameter of the fibers has been reduced to that which is desired for the apertures of the cavities in the ribbon and the thickness of the interdisposed walls of the coating metal has been reduced to that which is desired for the walls between the cavities. Similarly, the overall diameter of the structure is reduced to approximately the width desired for the final foraminous ribbon.

After completion of the metal working processes described above, the resulting drawn bundle of wire C is cut into predetermined length (as shown in FIG. 4). Following cutting, the wire C is sliced from opposite sides except for a length L at each end of which provides mechanical and electrical connections. A series of riser sections R are formed connected by joiner sections J. The thickness of the slices will, in general, be thin in comparison to their widths and will ultimately be adjusted to provide the necessary strength and electrical characteristics. The slicing direction is generally perpendicular to the wire drawing direction and to the direction of the array of fibers of the mandrels and the walls of the coatings interposed between the fibers.

Following the slicing, the wires are stretched axially to form a zig-zag ribbon which with faces which were originally perpendicular to the wire drawing direction before stretching and which face generally outwardly and not toward each other to form a ribbon after stretching.

The assembly is ready to have the mandrels removed. With tungsten on molybdenum mandrels, a solvent to remove the mandrel is a mixture of nitric and sulfuric acid, as is well known, to dissolve the molybdenum mandrel from the tungsten without dissolving the tungsten. On the other hand, if the wire or mandrel is steel, hydrochloric acid is used to remove it. The ribbon is immersed in the acid or solvent for a sufficient time to dissolve the fibers of the wire beginning at the distal ends at the ribbon's surface creating holes or cavities that penetrate into the surface. The step may be but not necessarily need be continued until the mandrel fibers have been etched through completely from both sides and leave only the residual structure of walls of the coatings surrounding empty cavities. Because the length of the uncut end sections is several times the ribbon's thickness, the mandrel will not be completely dissolved from the end sections so that they will retain a certain mechanical strength and can serve as mechanical and electrical connections.

The riser section R is shown in partial view in FIG. 6B. The magnification of FIG. 6B is shown in FIG. 6C. As illustrated, the cavities K have a generally hexagonal configuration and are bounded by the walls W that are formed when the molybdenum mandrel 2 is etched from coating 1 (as shown in FIG. 1). The walls W have a generally hexagonal configuration because of the drawing mentioned previously which forces the individual wires and coatings into hexagonal configurations. As shown, the hexagonal cavities are formed by walls of thicknesses less than about one-half the mean width of cavities K.

Generally, the wire that is used to form the mandrel 2 can have a diameter of less than 35 microns. According to the requirements for cavity quantum emission that suppresses electromagnetic radiation of wave lengths longer than 0.7 microns, it is necessary to reduce the diameter of the individual wires from the 35 microns to about 0.35 microns, a one hundred fold reduction. The ribbon that will ultimately be formed may have a diameter of approximately 0.5 centimeters.

Drawing of the bundle is accomplished through a series of dies and continues on a selected schedule of reductions of area and speeds, as is well known. The array of coated mandrels is heated before it is drawn, but is maintained at a temperature below the recrystallization temperature. After a number of reductions of diameter are completed, the bundle has absorbed a great deal of energy and therefore, it must be strain relieved by annealing. At the smaller sizes, diamond dies are used for the reduction. The annealing is done in a protective hydrogen atmosphere, as is well known. As the bundle is drawn, it may be cut into shorter lengths and rebundled into another hexagona array for further drawing so as to reduce the size of the mandrel fibers, perhaps one hundred fold. At each of the rebundling steps, the wire may be cleaned by boiling it in caustic or heating it in a wet reducing atmosphere. Further cleaning and surface treatments can be accomplished by etching and electromagnetic polishing. In some cases, when drawing tungsten coated molybdenum wires, lubrication is necessary for drawing. Commonly, the surfaces of the drawn wires become lightly oxidized during drawing and they are coated with a graphite based lubricant. The graphite adheres to the oxide and lubricates the passage of the wire through the die. Such cleaning and lubrication processes are well known to the prior art of wire drawing of tungsten and molybdenum. It is possible that such oxides or graphite may penetrate between the wires of the bundle and coat the surface of the individual wires which would prevent the tungsten surfaces from fusing together in the metalworking.

Figure 7:
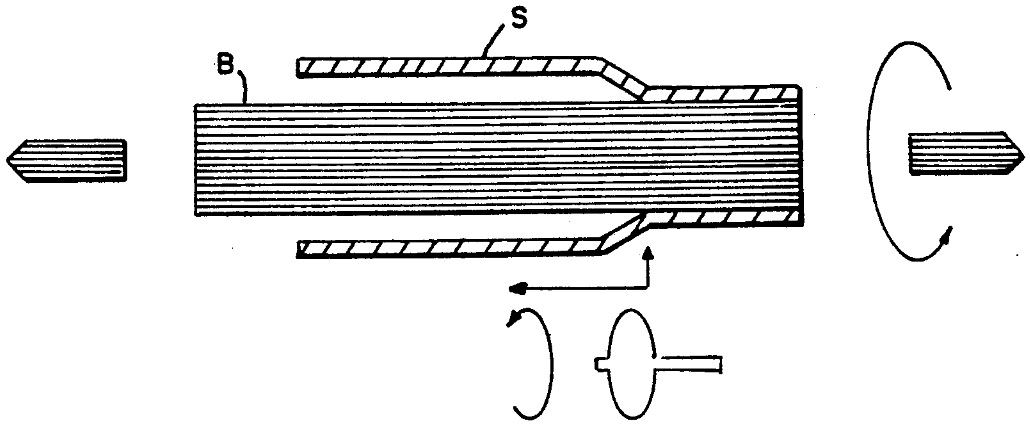
FIGS. 7 and 8 illustrate a method of reducing the diameter of the coated wires when oxidation and lubricants pose a problem in welding the coatings together.
Figure 8:
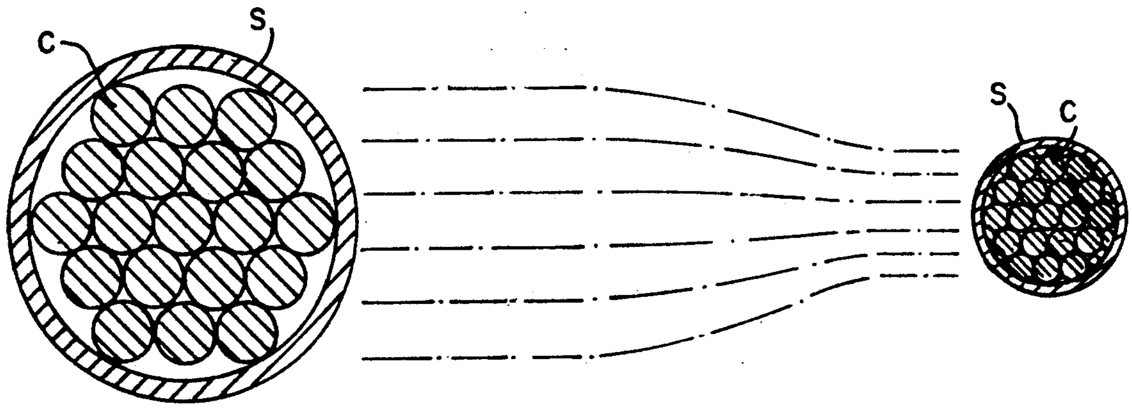
Figure 9:
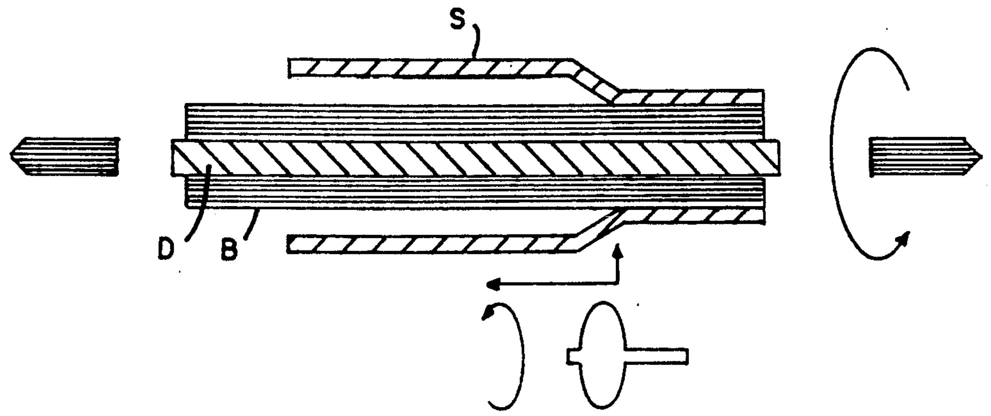
FIGS. 9 and 10 illustrate an embodiment in which the encapsulated bundles are arrayed around a soluble core, such as of copper, for diameter reduction. Spiral cutting of a portion of the bundle and removal of the core produces a helically-shaped radiator (FIG. 11).

To reduce such problems, in my preferred embodiment, the bundle of wire is encased in a sheath of a third metal which is disposed around the bundle by swaging and spinning a sheath S of copper, as shown in FIG. 7. The copper sheath is longer than the bundle and is pulled (while rotating) while it is engaged by a spinning wheel that urges against it. As is well known to the art, the combination of the pulling, the spinning wheel and the rotation causes the sheath to tightly engage the underlying bundled array of wires to provide a tight covering. When the sheathing is compete, the ends are pinched off after care has been taken to evacuate all traces of residual air from the interstices of the bundle.

The outer surface of the copper sheath is then lubricated for swaging, rolling and/or wire drawing, as necessary and as is conventional in the wire formation art. The diameter of the assembly is then reduced and after reduction as necessary the copper is removed by dissolving in hydrochloric acid.

Figure 10:
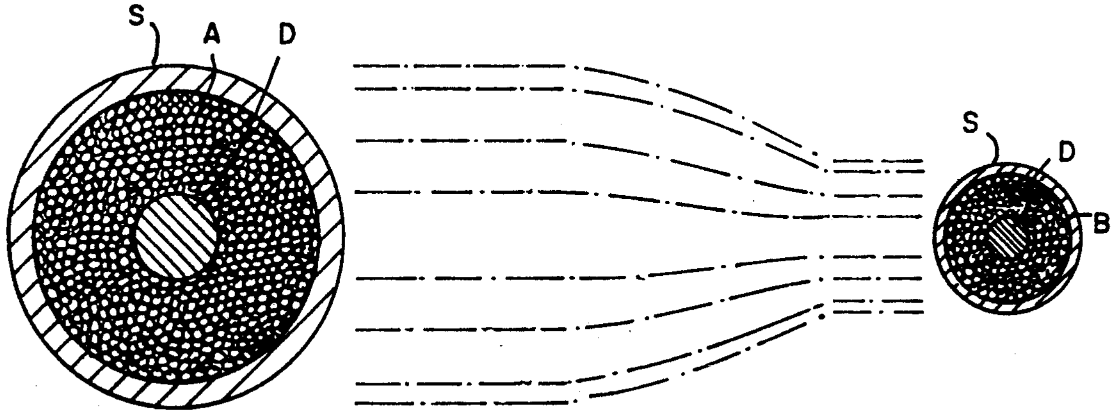

Copper encapsulation is particularly advantageous in predetermining the final geometry of the foraminous ribbon. A bundle of bundles B can be assembled around a copper core D and an outer copper sheath S is disposed around the bundle of bundles to encapsulate them. The diameter of the cored, encapsulated bundle B is then reduced to the final size as shown in FIG. 10 on the right. The completed wire is than cut to length and partially sliced in a spiral pattern, as shown in FIG. 11. The slices penetrate the copper core and extend partway therein, the pitch and diameter of the spiral being made generally small in comparison to the diameter of the wire. Again, the ends are left uncut forming electrical and mechanical supports, as discussed hereinbefore. The copper is then etched away in hydrochloric acid and the spirally bundled array wire is stretched out to form a spiral ribbon of very open pitch, as shown in FIG. 12.

The molybdenum is then etched out of the ribbon as before, leaving a foraminous tungsten spiral ribbon between two supports. In the magnified view of FIG. 12A, the ribbon is shown to have a uniform array of cavities substantially perpendicular to the surface of the tungsten ribbon and separated by walls having thicknesses less than approximately one half the diameter of the cavity.

It is apparent that modifications and changes can be made within the spirit and scope of the present invention. In the present application, for example, tungsten has been described as the metal that is coated on the mandrel and molybdenum is described as the appropriate metal for the mandrel. It is apparent, however, that gold and platinum may also be used for the coating metal in addition to the extensively discussed refractory metals, tungsten and molybdenum while copper or steel may serve for the mandrel metal. The feature of primary importance is that the second metal has to be soluble in a solution in which the first is insoluble or very weakly soluble, thus predicating that they are different metals.

As my invention I claim:

1. A method of forming a foraminous ribbon having cavities of predetermined dimensions, said method comprising:

coating a plurality of wires with a metal at predetermined thicknesses, said wires being soluble in a solvent and said metal being insoluble in said solvent;

forming a bundle of a multiplicity of said coated wires, the coatings on said wires engaging each other;

reducing the diameter of said bundle to a smaller predetermined diameter and simultaneously fusing the coatings together with metallurgical bonds through said reduction in diameter, thereby uniformly reducing the diameter of each of the coated wires and thicknesses of each of the coatings on the wires in said bundle;

slicing partially through said fused bundle at predetermined regular intervals whereby to create a ribbon of a thickness defined by the distance between slices;

chemically removing said wires from inside said coatings whereby to form a foraminous ribbon having surfaces perforated by an array of cavities of predetermined depths and diameters formed by the drawn coatings.

2. A method of forming a foraminous electromagnetic radiator having cavities of predetermined dimensions, said method comprising:

coating a plurality of wires with an electromagnetic radiator material at predetermined thicknesses, said wires being soluble in a solvent and said radiator material being insoluble in said solvent;

forming a bundle of a multiplicity of said coated wires, the coatings on said wires engaging each other;

reducing the diameter of said bundle to a smaller predetermined diameter and fusing the coatings together with metallurgical bonds through said reduction in diameter, thereby uniformly reducing the diameter of each of the coated wires and thicknesses of each of the coatings on the wires in said bundle;

slicing partially through said fused bundle at predetermined regular intervals whereby to create a ribbon of thicknesses defined by the distance between slices;

chemically removing a portion of said wires from inside said coatings whereby to form a foraminous electromagnetic radiator having surfaces perforated by an array of cavities of predetermined depths and diameters formed by the drawn coatings.

3. The method according to claim 2 wherein the electromagnetic radiator material is coated on said wires by plating, flame spraying, physical evaporation, sputtering from a target or chemical vapor deposition.

4. The method according to claim 2 wherein the wires are formed of molybdenum or steel.

5. The method according to claim 2 wherein the slicing of said fused bundle is alternatively on one side of the said bundle and then on the other, the penetration of the slice extending at least about halfway into the bundle but not sufficiently far into the bundle to slice entirely through said bundle whereby the longitudinal integrity of said bundle can be maintained.

6. The method according to claim 2 wherein the diameter of the bundle of coated wires is reduced by swaging, rolling or wire drawing.

7. The method according to claim 6 wherein the cavities have predetermined widths such that only radiation emitted at wavelengths less than a predetermined value can be propagated by said radiator, said predetermined wavelength being selected to suppress a majority of the non-visible infra red whereby to reduce heat.

8. The method according to claim 6 wherein the cavities have mean widths of approximately 0.35 to 1 microns.

9. The method according to claim 6 wherein the cavities have depths substantially greater than the widths of the cavities.

10. The method according to claim 2 wherein the spacing between the slices is between about 10 and 100 microns.

11. The method according to claim 2 wherein the distal ends of the electromagnetic radiator are sheathed in a electrical connector and the wires are not dissolved from inside the coatings of the bundle in said distal ends.

12. The method according to claim 2 wherein the mean width of said cavities is about 0.35 microns and the walls formed by the coatings are about 0.15 microns, said cavities having depths between about 2 to 20 times the mean width of said cavities.

13. The method according to claim 2 further including the steps of assembling an array of the bundles and sheathing said array in a metal sheath, evacuating air from the sheathed array of bundles, sealing the ends of said sheath and drawing the sheathed array through dies to reduce its diameter to a predetermined diameter.

14. The method according to claim 13 further including assembling said array of bundles around a core of metal that is more ductile than the metals of said bundles.

15. A method of making a foraminous metal ribbon having a regularly spaced array of holes having predetermined widths, said method comprising:

depositing a coating of uniform thickness of a first metal upon the surface of wires of the second metal, said second metal being soluble in an acid or solvent in which said first metal is insoluble or poorly soluble, said coating having a thickness of less than about one quarter the diameter of said wires;

assembling said coated wires into a bundle, the diameter of said bundle bearing approximately the same ratio to the width of the final ribbon as the diameter of the wires bears to the dimensions of the aperture of the holes in the final ribbon;

bundling and rebundling and drawing and redrawing the bundle until the apertures reach a predetermined width;

cutting the ribbon thereby produced to predetermined lengths and partially severing the wire at predetermined intervals;

dissolving the wires from inside of the coated material thereby to form apertures of predetermined widths and spaced from each other by the drawn coatings of predetermined thicknesses.

* * * * *